United States Patent

Fox et al.

[11] Patent Number: 6,039,158
[45] Date of Patent: Mar. 21, 2000

[54] POWERED LOCOMOTIVE PARKING BRAKE

[76] Inventors: Richard H. Fox, E. 1600 Sturgeon, Rathdrum, Id. 83858; David M. Steinbacher, 8424 N. Nevada, Apt. 195; Wesley L. Olin, E. 1012 Parkhill Dr., both of Spokane, Wash. 99208; Vernon O. Meyers, 1208 N. Van Marter, Spokane, Wash. 99206; William J. Zimmerle, 387111 N. Jackson Rd., Elk, Wash. 99009

[21] Appl. No.: 08/909,452

[22] Filed: Aug. 11, 1997

[51] Int. Cl.[7] .................. B60L 7/00; B60T 7/20; F16H 1/00
[52] U.S. Cl. ............... 188/162; 188/3 R; 188/34; 188/72.9; 188/71.2; 74/625
[58] Field of Search .................. 188/29, 34, 57, 188/72.6, 72.9, 162, 3 R, 71.2; 74/142, 625

[56] References Cited

U.S. PATENT DOCUMENTS

| | | | |
|---|---|---|---|
| 1,075,814 | 10/1913 | Buda . | |
| 1,555,831 | 10/1925 | Case . | |
| 1,841,272 | 1/1932 | Apple | 188/162 |
| 1,961,010 | 5/1934 | Norbom | 105/192 |
| 2,747,693 | 5/1956 | Hines | 188/33 |
| 3,398,819 | 8/1968 | Ruhl et al. | 192/4 |
| 3,539,038 | 11/1970 | Taber | 188/162 |
| 3,702,125 | 11/1972 | Jeffries | 188/71.8 |
| 3,809,191 | 5/1974 | Woodward | 188/106 A |
| 3,880,262 | 4/1975 | Besoyan | 188/162 X |
| 4,949,824 | 8/1990 | Buckley et al. | 192/45 |
| 5,178,237 | 1/1993 | Ursel et al. | 188/106 P |
| 5,219,049 | 6/1993 | Unterborn | 188/156 |
| 5,325,939 | 7/1994 | Schwendt | 188/33 |

*Primary Examiner*—Mark T. Le
*Assistant Examiner*—Jeffrey Woller
*Attorney, Agent, or Firm*—Stoel Rives LLP

[57] ABSTRACT

A power-actuated parking brake is provided that produces sufficient force to set a parking brake for a locomotive. A powered drive train rotates a sheave over which a brake chain is positioned. Rotation of the sheave draws up the brake chain that is connected at one end to the parking brake. The parking brake is set when sufficient tension is applied to the brake chain by the powered drive. The drive train includes a drive shaft driven by an electric motor and connected to the sheave through a planetary reduction drive and a clutch.

13 Claims, 4 Drawing Sheets

6,039,158

POWERED LOCOMOTIVE PARKING BRAKE

TECHNICAL FIELD

This invention relates to a parking brake system for locomotives and more particularly to a locomotive parking brake system incorporating a power-actuated parking brake that can alternatively be manually operated.

BACKGROUND OF THE INVENTION

All locomotives are required by the Federal Railroad Administration to have a parking brake to prevent accidental movement when the locomotive is parked and unattended. Typically, these locomotive parking brakes are manually set by a hand-actuated ratchet lever that tensions a brake chain connected to a wheel brake. The wheel brake is set when the brake chain applies sufficient tension to the wheel brake.

The ratchet lever is normally located at one side of the locomotive and is usually oriented in a vertical position. To reach the ratchet lever an operator must stand on a narrow walkway that runs along the side of the locomotive. In order to actuate the ratchet lever the operator must assume an awkward body position. The ratchet lever must be actuated a number of times in order to obtain the required force of between 175–400 ft.-lbs to set the parking brake. The physical force required to actuate the ratchet lever increases with each stroke as the brake chain is tensioned. Since the operator must assume an awkward body position while actuating the ratchet lever, the potential for strain or sprain injury increases with each stroke of the ratchet lever. The last few strokes of the ratchet lever require a great amount of physical force creating the highest potential for injury. Traditionally, prevention of personal injuries associated with a manual locomotive parking brake has centered around training employees in proper body mechanics and techniques designed to reduce the potential for injury. However, even with employee training, recent studies have shown that such injuries still occur at an unacceptable level.

Another problem that may occur is that, due to the difficulty in setting the locomotive parking brake, some operators may neglect fully setting the brake when the locomotive is left unattended. In addition to the safety problems posed by failing to fully set the brake, such neglect may result in fines or citations from the Federal Railroad Administration.

The present invention solves the above-mentioned problems by providing a powered locomotive parking brake. The locomotive is equipped with a powered drive train that provides the required force of between 175–400 ft.-lbs. to set the parking brake. The powered drive train prevents both the likelihood of injury to the operator and inadequate setting of the parking brake.

Power-assisted parking brakes for automotive vehicles have been known as can be seen, for example, in U.S. Pat. No. 5,178,237. This device comprises a manual brake lever that acts through a Bowden cable to actuate a wheel brake. An electric motor is also connected to the Bowden cable to supply assisting power to set the brake. This device has three modes of operation. These modes of operation include an automatic mode in which the parking brake is set by an electric motor, a power-assist mode in which the electric motor is activated by a manual lever, and a mechanical auxiliary mode in which the brake is set by the manual lever. This device is not acceptable for use to set a locomotive safety brake because of the large amount of force required to set a locomotive safety brake.

A safety stop for a structure that travels along a rail is disclosed in U.S. Pat. No. 1,555,831 in which a motor operates through a series of gears and links to actuate flanges into engagement with the rail. The flanges prevent movement or drifting of the structure caused by wind. A wedge provides an additional stop and is simultaneously moved into engagement with a wheel of the structure to prevent movement.

A brake for a railway train is disclosed in U.S. Pat. No. 1,075,814. The brake of this invention includes a wedge-like member that, when actuated, frictionally engages a wheel of the train and skids along the rail to brake the train. The brake has a flange or flanges that snugly engage the inner faces of the rails to prevent derailment of the car.

A braking system for a rail car is disclosed in U.S. Pat. No. 1.961,010 in which brakes comprising air cylinders are positioned directly in line with the brake shoes to eliminate extra levers and push rods and to obtain quick braking action.

A tractor brake is disclosed in U.S. Pat. No. 3,398,819 in which actuation of the brake causes disengagement of the main clutch and disengagement of the brake causes the main clutch to re-engage.

An electrical control system for brakes is disclosed in U.S. Pat. No. 2,747,693.

SUMMARY OF THE INVENTION

It is an object of the invention to provide a power-actuated parking brake for a locomotive.

It is another object of the invention to provide a power-actuated parking brake that produces sufficient force to set a parking brake for a locomotive.

Another object of the invention is to provide a power-actuated locomotive parking brake that substantially reduces or eliminates risk of injury resulting from manually setting the locomotive parking brake.

Still another object of the invention is to provide a power source for a locomotive parking brake that can be adapted to existing locomotive parking brakes.

A further object of the invention is to provide a power source for a locomotive parking brake that is adapted for either side-mounting or front-mounting.

Yet another object of the invention is to provide a power-actuated locomotive parking brake that is readily accessible and easy to use.

In a preferred embodiment, the present invention provides a power-actuated locomotive parking brake that is powered by a drive assembly capable of producing sufficient force required to set the locomotive parking brake. The drive assembly rotates a sheave over which a brake chain is positioned. Rotation of the sheave draws up the brake chain that is connected at one end to the parking brake. The parking brake is set when sufficient tension is applied to the brake chain by the drive assembly.

The drive assembly includes a drive shaft driven by an electric motor and connected to the sheave through a planetary reduction drive and a clutch. The planetary reduction drive increases the power output of the drive shaft. The electric motor is connected to a control having an on/off switch. The parking brake is set by switching on the electric motor which rotates the sheave through the drive assembly until sufficient tension is applied to the brake chain to set the parking brake. A visual inspection of the brake chain reveals when the parking brake is set. Once the parking brake is set the clutch will slip and the electric motor is then turned off.

If the powered drive assembly is inoperable the parking brake can be set by use of a manual actuator. The manual actuator includes a ratchet mechanism connected to the sheave and operated by a ratchet lever to rotate the sheave to tension the brake chain and set the parking brake.

The drive assembly may be connected to the sheave in various positions depending on the availability of space. For example, some locomotives require the drive assembly to be positioned horizontally. Other locomotives require the drive train to be located in the nose of the locomotive car in which case the drive train must be positioned vertically due to lack of space.

Additional objects and advantages of this invention will be apparent from the following detailed description of the preferred embodiments thereof which proceeds with reference to the accompanying drawings.

DETAILED DESCRIPTION OF PREFERRED EMBODIMENT

Figure 1:
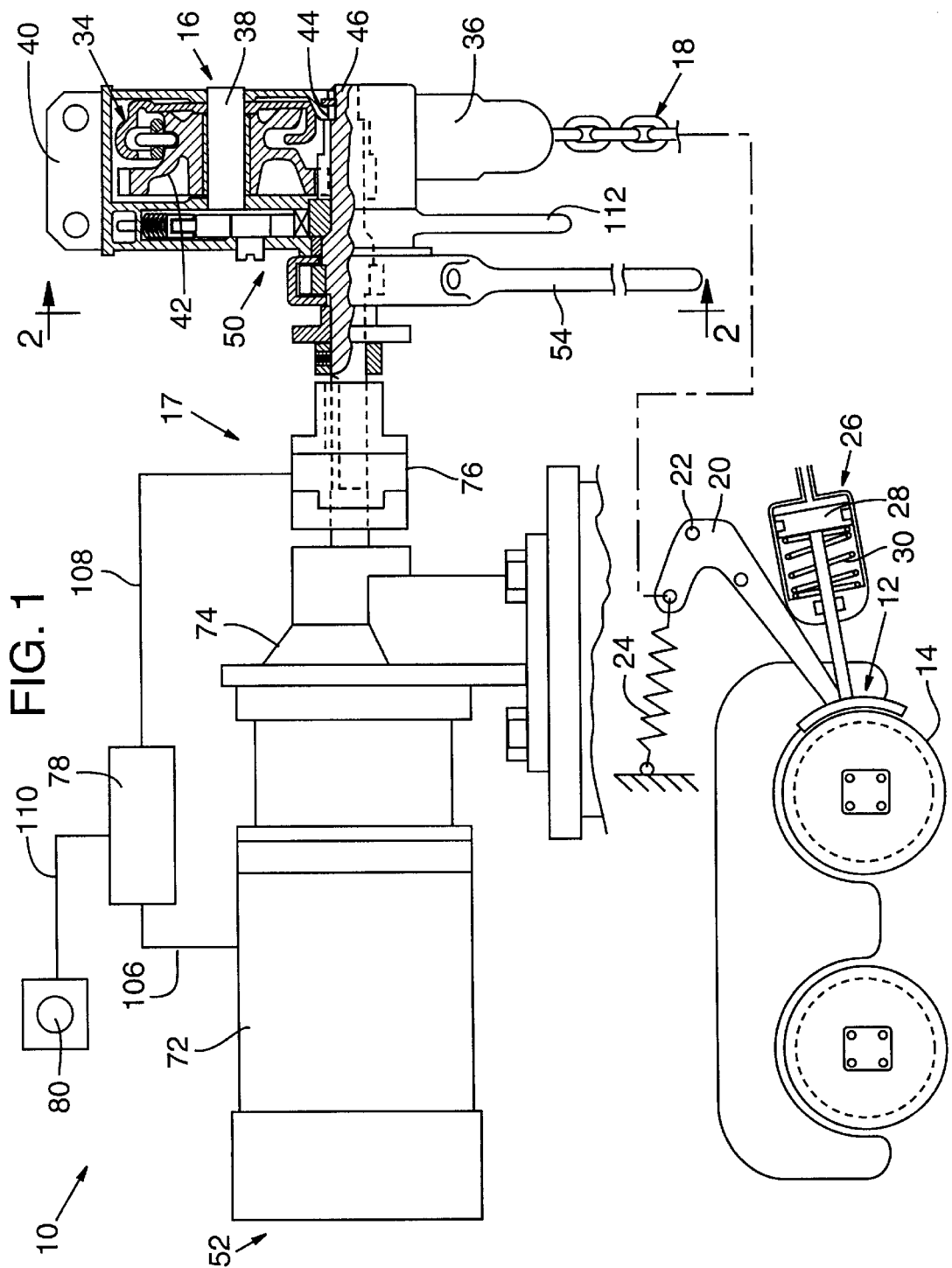
FIG. 1 is a schematic side elevational view of a locomotive parking brake system embodying the present invention.

FIG. 1 illustrates a schematic side elevation of a locomotive parking brake system 10. A parking brake 12 is associated with at least one wheel 14 of the locomotive. The parking brake 12 is set and released by an actuating mechanism 16 driven by a drive assembly 17 through a flexible force transmitting member preferably in the form of a brake chain 18. The brake chain 18 has one end operatively connected to the actuating mechanism 16 and the opposite end operatively connected to the parking brake 12. The brake chain 18 is connected to the parking brake 12 through a spring-actuated arm 20 pivotally connected at 22 to the locomotive housing. A release spring 24 is connected between the locomotive housing and the spring-actuated arm 20 to release the parking brake 12 when tension in the brake chain 18 is released. The parking brake 12 is of the standard type of locomotive air brake that is actuated by a piston cylinder 26 connected to a source of compressed air (not shown). The pressurized air acts against a top face of a piston 28 to set the parking brake 12. A spring 30 acts against an opposite face of the piston 28 to initially release the parking brake 12.

The brake chain 18 is supported by the actuating mechanism 16 for drawing up the brake chain 18 to apply a force to the spring-actuated arm 20 to set the parking brake 12. This position is seen in phantom in FIG. 2. The actuating mechanism 16 includes a sheave 34 (FIG. 1) over which the brake chain 18 is positioned. To keep the brake chain 18 positioned over the sheave 34 a weight 36 generally in the range of about 3 to 5 lbs. is attached to the free end of the brake chain 18. This is seen most clearly in FIG. 2 where the sheave 34 has been omitted for clarity. The sheave 34 is supported for rotation by a shaft 38 mounted within a housing 40. The sheave 34 includes a toothed wheel 42 fixed thereto for rotation about shaft 38. The toothed wheel 42 is in driving engagement with a splined coupler 44 fixed to a drive shaft 46 driven by the drive assembly 17. Drive shaft 46 can be actuated either manually by a ratchet mechanism 50 or automatically by a powered drive 52.

The ratchet mechanism 50 includes a ratchet handle 54 within which a ratchet wheel 56 is located (FIG. 2) non-rotatably mounted to the shaft 46. A pawl 58 is pivotally supported on the ratchet handle 54. The pawl 58 is normally held out of engagement with the ratchet wheel 56 against an adjustable stop 60 preferably in the form of a set screw. The pawl 58 is held against the stop 60 by a back stop 62 associated with the housing 40. The back stop 62 forces the leg 64 of pawl 58 against the action of a spring 66 to keep the pawl 58 out of engagement with ratchet wheel 56.

In order to manually draw up the brake chain 18, the ratchet handle 54 is rotated in the direction of arrow 68 just enough to disengage the leg 64 of pawl 58 from the back stop 62 so that spring 66 urges the pawl 58 into engagement with the ratchet wheel 56. Once the ratchet mechanism 50 is set, the brake chain 18 can be drawn up by rotating the ratchet wheel 56 in the direction of arrow 68 (FIG. 2) by the ratchet handle 54 in a known manner. The ratchet wheel 56 turns the drive shaft 46 in the same direction. The coupler 44 rotates the toothed wheel 42 and, thus, the sheave 34 in an opposite direction. This movement tightens the chain 18 causing it to pull upon the arm 20 to set the brake as the weight 36 moves down to the position shown in phantom in FIG. 2. The sheave 34 is prevented from free-spinning by a second ratchet mechanism 70 in a manner known by those skilled in the art.

Figure 3:
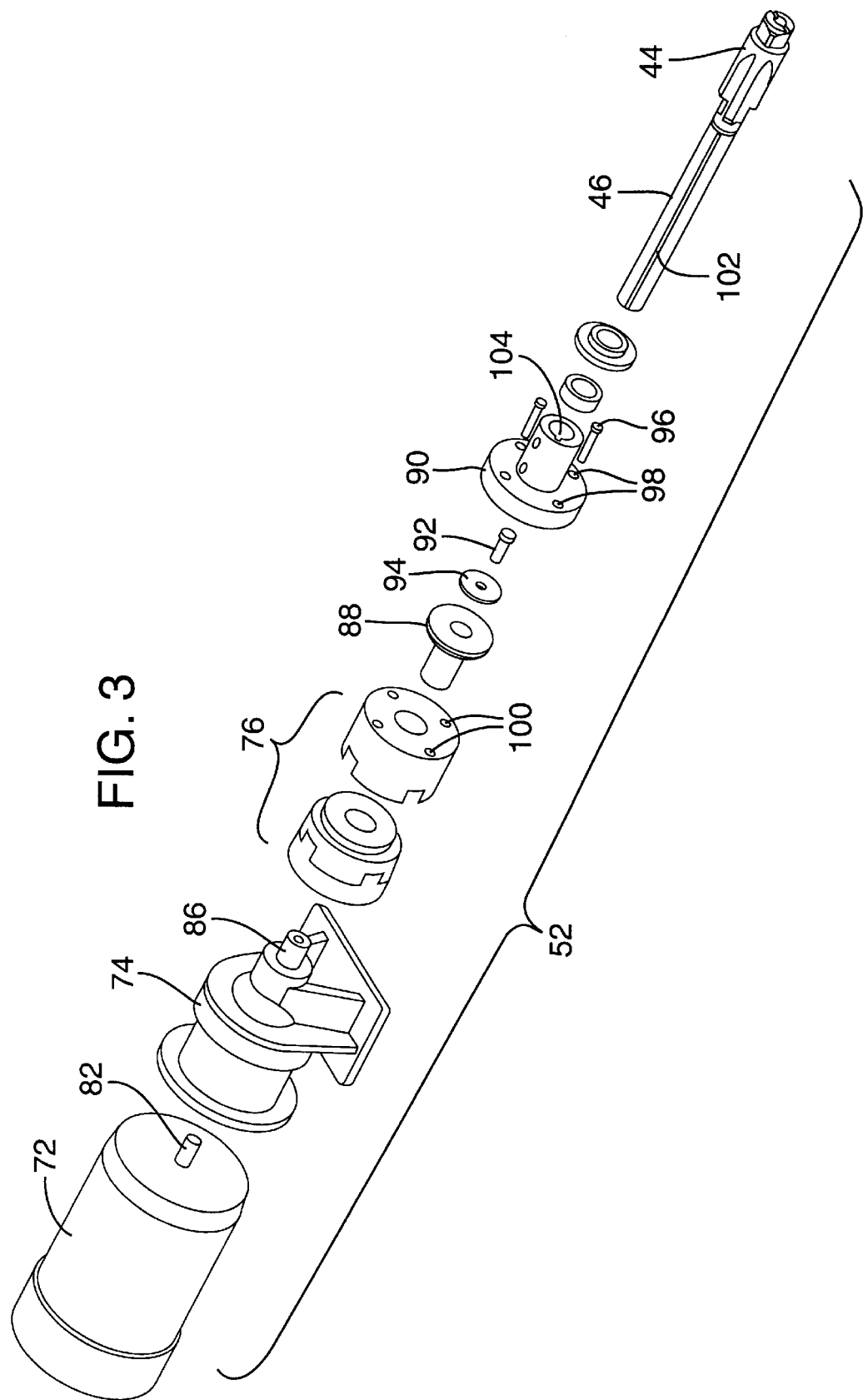
FIG. 3 is an exploded view of the powered drive assembly.

The powered drive train 52 can be seen most clearly in FIGS. 1 and 3 to include a motor 72, a planetary reduction drive 74, and a clutch 76. The motor 72 and the clutch 76 are connected to a source of power 78 and are operable through a control switch 80. The motor 72 is preferably a 3/4 C-Frame 74 volt DC motor having a drive shaft 82 connected to the planetary reduction drive 74. The planetary reduction drive 74 preferably has a 86:1 gear ratio and an output of about 2500 RPM to drive the clutch 76 through a drive shaft 86. The clutch 76 is preferably an electric clutch such as the Matix Model GD 101 manufactured by Matex Engineering. The clutch 76 is connected to the drive shaft 46 through a bushing 88 and a collar 90. The bushing 88 is preferably secured to the clutch 76 by a connector, such as a bolt 92 and washer 94 and the collar 90 is preferably connected to the clutch 76 by connectors, such as, bolts 96 extending through openings 98 in the collar 90 and threaded into openings 100 in the clutch 76. The drive shaft 46 is non-rotatably connected to the collar 90 by a key 102 extending along the length of the drive shaft 46 and that mates with keyway 104 in the collar 90. Both the motor 72 and the clutch 76 are connected through lines 106 and 108 to power source 78, such as, for example, eight 8-volt batteries connected in series. The control switch 80 is connected through a line 110 to the power source 78 to actuate the motor 72 and clutch 76.

Figure 2:
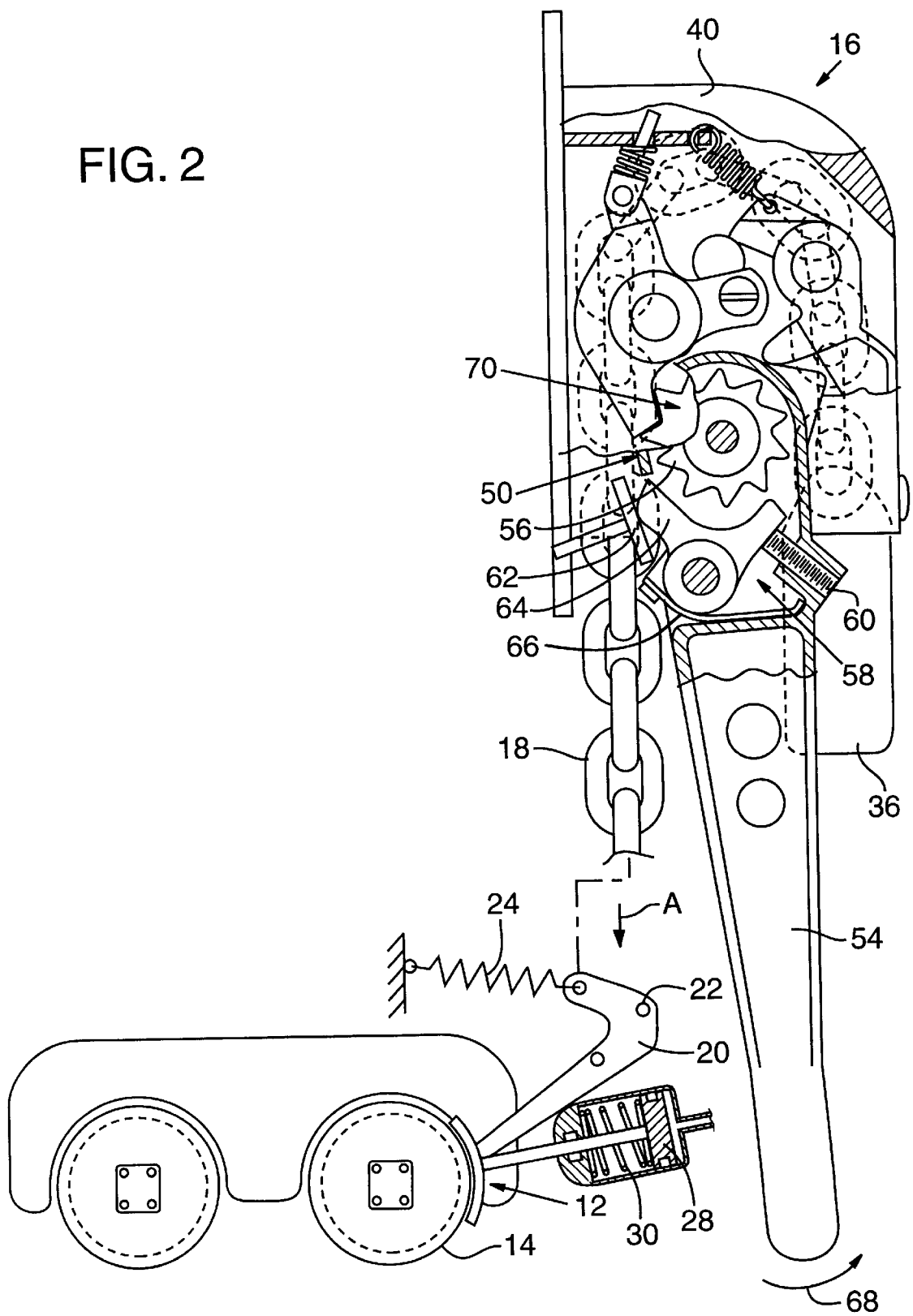
FIG. 2 is a view of the ratchet mechanism along line 2—2 in FIG. 1.

When the locomotive is in motion the safety brake 12 is disengaged and the brake chain 18 is in the position shown in solid lines in FIG. 2. When the locomotive is parked, the parking brake 12 is set by actuation of the control switch 80. The motor 72 and clutch 76 then receive power from the power source 78 through lines 106 and 108. The motor 72 drives the shaft 46 through the planetary reduction drive 74 and clutch 76. The shaft 46 rotates the sheave 34 in a direction opposite of arrow 68 to draw up the brake chain 18 as it moves to the position shown in phantom in FIG. 2. As the brake chain 18 is drawn up, it applies a force to the spring-actuated arm 20 to set the parking brake 12. The Federal Railroad Administration requires that a force of between 175–400 ft./lbs. be applied to securely set the parking brake 12. Thus, the control switch 80 is engaged until the required amount of force is applied to the parking brake 12. When the predetermined amount of force is reached, the clutch 76 slips disengaging the shaft 46 from the motor 72. The control switch 80 is then released to cut off power to the motor 72 and the clutch 76. The second ratchet mechanism 70 holds the brake chain 18 in place until it is desired to release the safety brake 12. In order to release the safety brake 12, a release handle 112 is provided to release the second ratchet mechanism 70 allowing the sheave 34 to free-spin so that the spring 24 pulls the arm 20 to release the parking brake 12. The tension in the chain 18 is released as the weight 36 is raised to the position in solid lines in FIG. 2. In case of a power failure or if the power drive train 52 does not function properly, the safety brake 12 can still be manually set by the ratchet mechanism 50 in accordance with the description set forth above.

Figure 4:
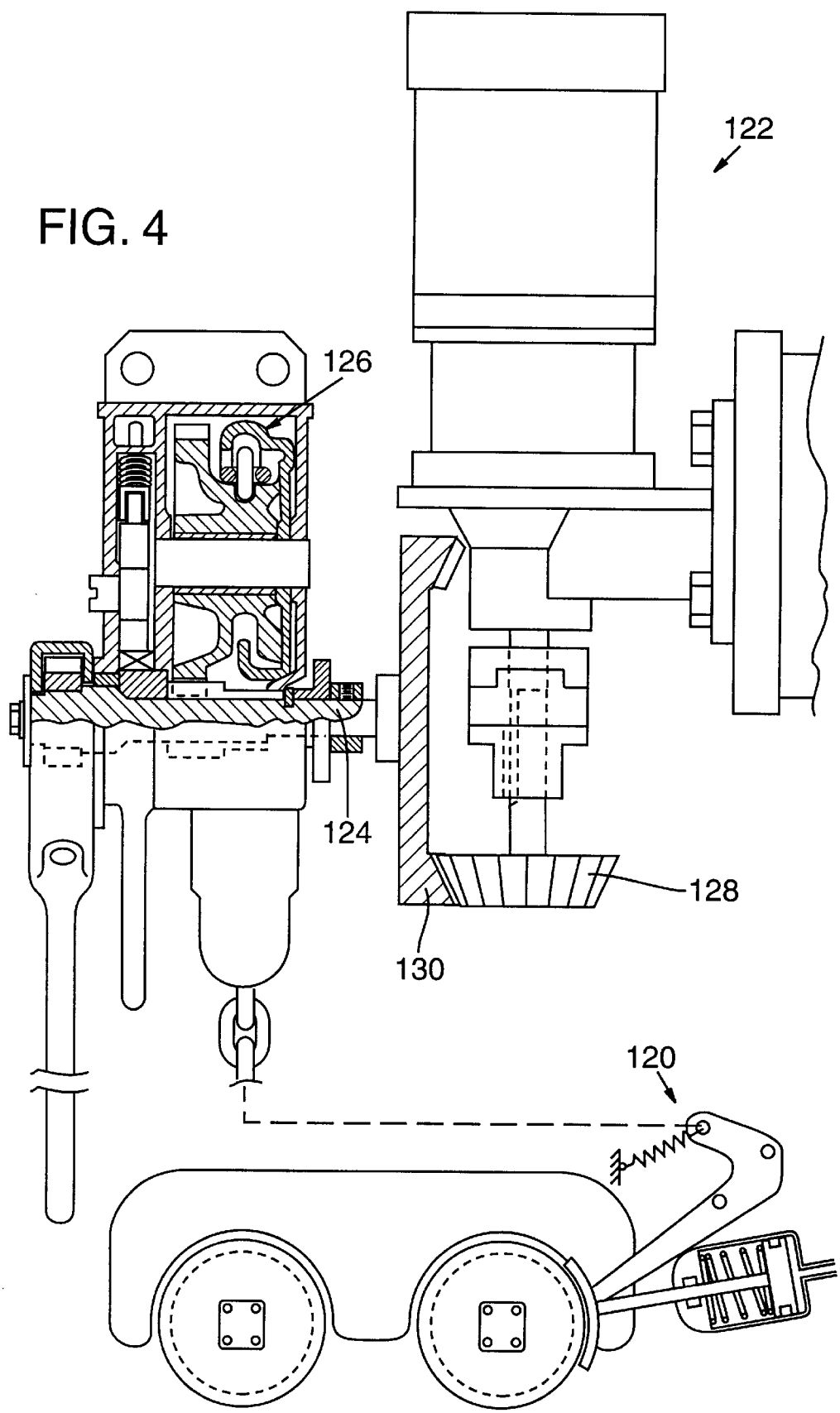
FIG. 4 is a schematic side elevational view of another embodiment of the locomotive parking brake system.

Another embodiment can be seen in FIG. 4 in which a locomotive parking brake 120 is provided that is substantially similar to the embodiment of FIGS. 1–3 with the main difference being that the powered drive train 122 is positioned at an angle of about ninety degrees from the shaft 124. Power is transferred from the drive train 122 to the sheave 126 through a set of bevel gears 128 and 130.

The foregoing relates to preferred exemplary embodiments of the invention, it being understood that other variants and embodiments thereof are possible within the spirit and scope of the invention, the latter being defined by the appended claims.

We claim:

1. A safety brake for a locomotive, comprising:

a force transmitting device connected to a brake mechanism associated with at least one wheel of a locomotive, an actuating mechanism operably connected to the force transmitting member and a powered drive for driving the actuating mechanism to apply a force to the brake mechanism, wherein the powered drive includes a motor, a planetary reduction drive for providing sufficient force to set the brake, and a clutch, the powered drive being constructed and arranged so that the motor operably drives the actuating mechanism through the planetary reduction drive and the clutch such that the clutch slips when sufficient force has been applied to the brake through the force transmitting member to set the brake, further comprising a manual drive for driving the actuating mechanism, the manual drive being located between the powered drive and the actuating mechanism, the manual drive having a first condition in which the manual drive operates the actuating mechanism and a second condition in which the manual drive does not operate the actuating mechanism, wherein only the powered drive operates the actuating mechanism when the manual drive is in the second condition.

2. The safety brake of claim 1 wherein the powered drive comprises a splined coupling operatively connected to the actuating mechanism for transferring power from the powered drive to the actuating mechanism.

3. The safety brake of claim 2 wherein a manual drive is connected to the splined coupling and is adapted to manually drive the actuating mechanism.

4. The safety brake of claim 1 wherein the powered drive produces a force of between 175–400 foot-pounds.

5. A brake mechanism for a locomotive having both a powered drive and a manual drive, comprising;

a motor that rotates a drive shaft through a clutch, the drive shaft being in operative engagement with a rotatable actuating mechanism that supports a force transmitting device to set and release a brake mechanism associated with at least one wheel of the locomotive, a ratchet handle coupled to the drive shaft, wherein the drive shaft can by rotated either by the motor through the clutch or by the ratchet handle to cause the force transmitting device to apply and release the brake.

6. The brake mechanism of claim 5 further comprising a housing mounted to the locomotive within which is mounted the actuating mechanism, the actuating mechanism comprising a toothed sheave rotatably mounted to the housing and in driving engagement with an end of the drive shaft.

7. The brake mechanism of claim 6 wherein the end of the drive shaft includes a spline for engagement with the toothed sheave.

8. The brake mechanism of claim 5 wherein the actuating mechanism is supported over the toothed sheave having one end connected to the brake through a spring arm and the other end connected to a weight to ensure that the actuating mechanism remains supported over the toothed sheave.

9. The brake mechanism of claim 5 wherein the motor is aligned along an axis with the drive shaft.

10. The brake mechanism of claim 9 wherein the ratchet handle is located between the clutch and the actuating mechanism.

11. The brake mechanism of claim 5 wherein the motor is mounted at an angle to the drive shaft.

12. The brake mechanism of claim 11 wherein the angle is about 90 degrees.

13. The brake mechanism of claim 11 wherein the ratchet handle is located on a side of the actuating mechanism opposite from the clutch.

* * * * *